(12) United States Patent
Hohn et al.

(10) Patent No.: US 9,973,397 B2
(45) Date of Patent: May 15, 2018

(54) DIAGNOSIS OF NETWORK ANOMALIES USING CUSTOMER PROBES

(71) Applicants: Nicolas Hohn, San Mateo, CA (US); Christopher Menier, San Mateo, CA (US); Maureen Wink, San Mateo, CA (US); Kyle Johnson, San Mateo, CA (US)

(72) Inventors: Nicolas Hohn, San Mateo, CA (US); Christopher Menier, San Mateo, CA (US); Maureen Wink, San Mateo, CA (US); Kyle Johnson, San Mateo, CA (US)

(73) Assignee: GUAVUS, INC., San Mateo, CA (US)

( * ) Notice: Subject to any disclaimer, the term of this patent is extended or adjusted under 35 U.S.C. 154(b) by 103 days.

(21) Appl. No.: 14/807,263

(22) Filed: Jul. 23, 2015

(65) Prior Publication Data

US 2016/0028645 A1  Jan. 28, 2016

Related U.S. Application Data (60) Provisional application No. 62/028,079, filed on Jul. 23, 2014.

(51) Int. Cl.
*G06F 15/173* (2006.01)
*H04L 12/24* (2006.01)
*H04L 12/26* (2006.01)

(52) U.S. Cl.
CPC .......... *H04L 41/507* (2013.01); *H04L 41/064* (2013.01); *H04L 41/0654* (2013.01); *H04L 41/5074* (2013.01); *H04L 43/0817* (2013.01)

(58) Field of Classification Search
CPC .............. H04L 41/507; H04L 41/5074; H04L 41/0654; H04L 41/064; H04L 43/0817
See application file for complete search history.

(56) References Cited

U.S. PATENT DOCUMENTS

| | | | | |
|---|---|---|---|---|
| 6,327,677 B1 * | 12/2001 | Garg | ....................... | H04L 41/06 709/224 |
| 8,284,679 B1 * | 10/2012 | Croak | ................. | H04L 41/0609 370/242 |

(Continued)

*Primary Examiner* — Michael A Keller
(74) *Attorney, Agent, or Firm* — Morgan, Lewis & Bockius LLP (57) ABSTRACT

Methods, apparatuses and systems for diagnosing network anomalies and allocating repair resources in a computer network receive network anomaly reports (NARs) from a group of customers. Each NAR specifies a network anomaly observed by a customer at a network endpoint. Each NAR is entered into a database and associated in the database with attributes including at least one customer attribute associated with the sender of that NAR or network attribute associated with the network anomaly specified in that NAR. A time period is detected during which the difference between an aggregate number of NARs received within that time period and a baseline number of NARs received during prior time periods of substantially identical duration exceeds a threshold. The attributes associated with the NARs received during the time period are analyzed to identify a network anomaly specified in those NARs. Repair resources are further preferentially allocated to the identified network anomaly.

25 Claims, 5 Drawing Sheets

(56) References Cited

U.S. PATENT DOCUMENTS

| | | | |
|---|---|---|---|
| 2004/0047354 A1* | 3/2004 | Slater | H04L 41/0896 370/400 |
| 2007/0179829 A1* | 8/2007 | Laperi | G06Q 10/06 705/7.16 |
| 2008/0155564 A1* | 6/2008 | Shcherbina | G06Q 10/06 719/318 |
| 2008/0195614 A1* | 8/2008 | Lutz | H04L 41/0654 |
| 2009/0055684 A1* | 2/2009 | Jamjoom | G06F 11/0709 714/26 |
| 2009/0074153 A1* | 3/2009 | Wu | H04M 3/306 379/1.04 |
| 2014/0006861 A1* | 1/2014 | Jain | G06Q 30/01 714/26 |

* cited by examiner

201
Receive a group of network anomaly reports (NARs) from a group of customers of the computer network, each of the NARs specifying at least one network anomaly of the computer network observed by a customer from the group of customers at at least one network endpoint of the computer network

↓

203
Enter each NAR from the group of NARs into a database and associate, in the database, each NAR with a group of attributes including at least one customer attribute associated with the sender of that NAR or network attribute associated with the at least one network anomaly specified in that NAR

↓

205
Detect a time period during which the difference between an aggregate number of NARs received within that time period and a baseline number of NARs received during prior time periods of substantially identical duration exceeds a threshold

↓

207
Analyze the attributes associated with the NARs received during the time period to identify at least one network anomaly specified in the NARs received within the time period

↓

209
Preferentially allocate repair resources to the identified at least one network anomaly

DIAGNOSIS OF NETWORK ANOMALIES USING CUSTOMER PROBES

PRIORITY CLAIM AND RELATED APPLICATION

This application claims priority to U.S. Provisional Application No. 62/028,079, entitled "Network Health Monitoring Using Customer Probes," filed Jul. 23, 2014, the entire disclosure of which is hereby incorporated by reference.

FIELD OF THE APPLICATION

The present application generally relates to the field of computer networks, and more particularly to methods, apparatuses and systems for diagnosing network anomalies using customer probes and allocating repair resources.

BACKGROUND

Computer-network providers and/or operators face many challenges in delivering network services to customers or partners. The provided computer network may be very large in terms of nodes, bandwidth, and throughput; it may be physically dispersed over a large area; and it may include a wide variety of different types of hardware and software. Furthermore, software designed to monitor a computer network for errors or anomalies may itself be fragmented into multiple different programs designed to monitor different aspects of the computer network. Such a variety and complexity of both the computer network itself and of the monitoring software may make it difficult or impossible for a network operator to detect problems or to do so efficiently. In addition, even if problems are indeed detected, they may be lost in a much greater number of false-positive error reports and mistakenly ignored.

Therefore, a need exists for an improved method, apparatus and system for diagnosing network anomalies and allocating repair resources for computer networks in a more reliable and efficient manner.

SUMMARY

Embodiments disclosed herein relate to methods for diagnosing network anomalies and allocating repair resources for a computer network. Embodiments of such a method include receiving network anomaly reports (NARs) from a group of customers of the computer network. Each of the received NARs may specify at least one network anomaly of the computer network that is observed by a customer from the group of customers at at least one network endpoint of the computer network.

Embodiments of the method include entering each received NAR into a database and then associating, in the database, each received NAR with a group of attributes, wherein the group of attributes include at least one customer attribute associated with the sender of that NAR or network attribute associated with the at least one network anomaly specified in that NAR. In some instances, a customer attribute can specify at least one of a service type, location, identifier, type of premises equipment, technician dispatch, hardware type, software version, network address, network type or prior NARs associated with a customer of the computer network. Also, a network attribute can specify at least one of a hardware type, software version, network address, network topology, network outage, network maintenance, or network type associated with the computer network.

The method then includes detecting a time period during which the difference between an aggregate number of NARs received within that time period and a baseline number of NARs received during prior time periods of substantially identical duration exceeds a threshold. In some instances, in order to detect such a time period, the method includes recording, for each received NAR, a timestamp indicating a time at which that NAR is received. In some instances, the baseline number of NARs associated with the time period can be pre-defined based on historical data associated with the computer network.

In various embodiments, the method also includes analyzing the attributes associated with the NARs received during the time period to identify at least one network anomaly specified in the NARs received within the time period. In some instances, in order to identify the network anomaly specified in the NARs received within the time period, the method can include determining at least one common attribute among at least a portion of those NARs. In some instances, in order to identify the network anomaly specified in the NARs received within the time period, the method can include comparing the attributes associated with those NARs with attributes associated with previously received NARs.

In some embodiments, additionally, the method includes preferentially allocating repair resources to the identified at least one network anomaly. In some instances, the method can include identifying, based at least in part on the identified at least one network anomaly and the attributes associated with the NARs received during the time period, a set of customers affected by the at least one network anomaly. In some instances, the method can further include reporting the identified at least one network anomaly to a network operator of the computer network via at least one of an email, Short Message Service (SMS) text message, automatic phone call, or social media.

In another aspect, the invention pertains to systems for diagnosing network anomalies and allocating repair resources for a computer network. Such a system may include nonvolatile computer storage including a database for storing information associated with NARs received from a group of customers of the computer network. Each of the received NARs may specify at least one network anomaly of the computer network that is observed by a customer from the group of customers at at least one network endpoint of the computer network. The system includes one or more computer processors configured for executing computer instructions. The system may also include a linking module, a monitoring module, an analysis module and an allocation module, each of which is executable by the computer processor(s).

The linking module may be configured to enter each received NAR into the database and then associate, in the database, each received NAR with a group of attributes, wherein the group of attributes include at least one customer attribute associated with the sender of that NAR or network attribute associated with the at least one network anomaly specified in that NAR. The monitoring module may be configured to detect a time period during which the difference between an aggregate number of NARs received within that time period and a baseline number of NARs received during prior time periods of substantially identical duration exceeds a threshold. The analysis module may be configured to analyze the attributes associated with the NARs received within the time period to identify at least one network anomaly specified in the NARs received within the time period. The allocation module may be configured to preferentially allocate repair resources to the identified at least one network anomaly.

In still another aspect, the invention relates to an apparatus for diagnosing network anomalies in a computer network. The apparatus may include a receiving module, a linking module, a monitoring module and an analysis module. The receiving module may be configured to receive NARs from a group of customers of the computer network. Each of the received NARs may specify at least one network anomaly of the computer network that is observed by a customer from the group of customers at at least one network endpoint of the computer network.

The linking module may be configured to enter each received NAR into a database and associate, in the database, each received NAR with a group of attributes, wherein the group of attributes include at least one customer attribute associated with the sender of that NAR or network attribute associated with the at least one network anomaly specified in that NAR. The monitoring module may be configured to detect a time period during which the difference between an aggregate number of NARs received within that time period and a baseline number of NARs received during prior time periods of substantially identical duration exceeds a threshold. The analysis module may be configured to analyze the attributes associated with the NARs received during the time period to identify at least one network anomaly specified in the NARs received within the time period. Additionally, in some instances, the apparatus may further include an allocation module that is configured to preferentially allocate repair resources to the identified at least one network anomaly.

Various advantages of the present application are apparent in light of the descriptions below.

BRIEF DESCRIPTION OF THE DRAWINGS

The aforementioned implementation of the present application as well as additional implementations will be more clearly understood as a result of the following detailed description of the various aspects of the application when taken in conjunction with the drawings.

DETAILED DESCRIPTION

As used herein, the term "computer network" means a system of intercommunicating computational and/or communication devices, and includes both computer networks and the public telecommunications infrastructure. Such computer networks include wired or wireless local-area networks (wired LAN or WLAN), wide-area networks (WANs), the Internet, local intranets, and/or other types of networks. "Network health" refers to the proper operation of a computer network, e.g., customers at network endpoints receive quality of service levels corresponding to their contract guarantees. A "network anomaly" is a network event affecting the operation of the network, and can occur anywhere within the network—i.e., from a transmission point through a switching or router "cloud" to a customer's endpoint premises equipment. Network anomalies can involve node outages, degraded performance, overloading, etc., and can result from network congestion, node failure within the network, electrical outages, and many other sources. A "network anomaly report" (NAR, sometimes also called a "trouble ticket") is a report of a network anomaly, typically transmitted by a customer and specifying a symptom observed by the customer. A NAR may or may not be easily traceable to the underlying network anomaly. "Network resources" means nodes or other network equipments. Customer-associated network resources (CANRs) are associated on a non-temporary basis with a customer, e.g., an endpoint equipment such as a customer's cable-modem termination system or a shared node servicing the customer (along with other customers). "Repair resources" refers to computational and/or technician attention devoted to correction of a network anomaly. A "network operator" is an entity (or one of a plurality of entities) such as a person, a company, an organization, etc., which is responsible for operating, allocating, managing, and repairing network resources. A "customer" of a computer network is an entity (e.g., a person, a company, an organization, etc.) that accesses and uses at least a portion of the computer network for any suitable purpose (e.g., research, study, entertainment, business, or any other personal or non-personal use). The term "substantially" or "approximately" means ±10% (e.g., by weight or by volume), and in some embodiments, ±5%.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
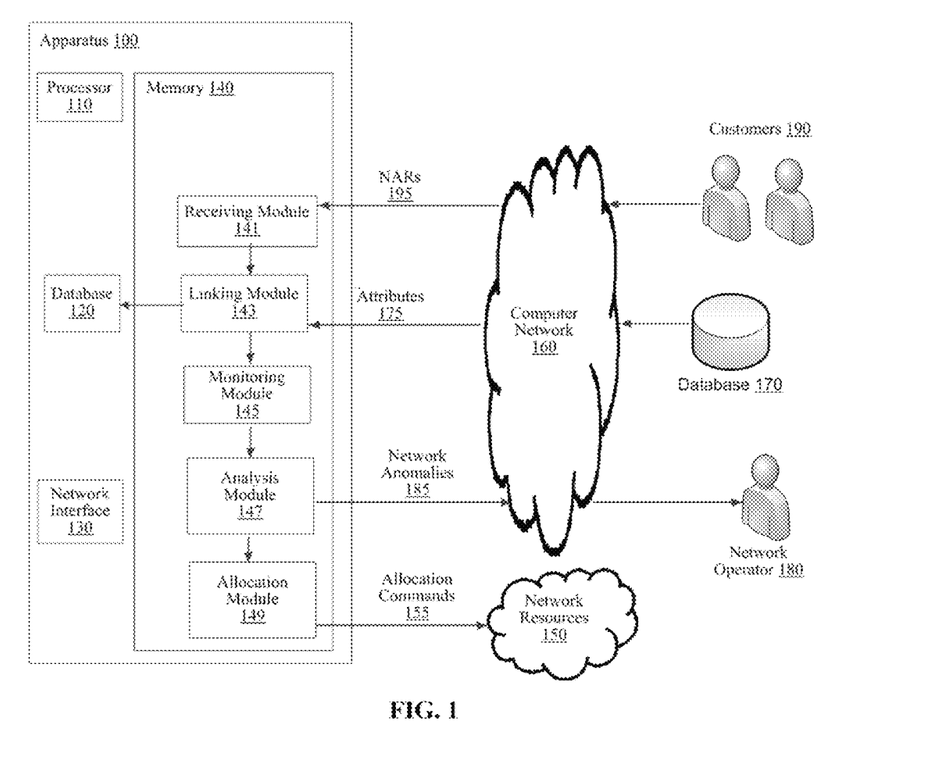
FIG. 1 is a schematic illustration of a system for diagnosing network anomalies and allocating repair resources for a computer network in accordance with some embodiments.

FIG. 1 is a schematic illustration of a system for diagnosing network anomalies and allocating repair resources for a computer network 160 in accordance with some embodiments. As shown in FIG. 1, the system includes an apparatus 100, a database 170, and one or more network resources 150. In some embodiments, the network resources 150 can include repair resources as defined above.

Moreover, the system can be accessed and used by one or more customers 190, and can be operated and managed by a network operator 180. In some embodiments, each of the customers 190 and the network operator 180 can be connected to and access the computer network 160 using a network endpoint (not shown in FIG. 1) of the computer network 160. Such a network endpoint can be, for example, a server device, a terminal device, a desktop computer, a laptop computer, a touchpad, a smart phone, a personal digital assistant (PDA), a tablet computer, a vehicle terminal, a wearable device, a handheld computer, a mobile Internet device (MID), or any other type of device that is configured to be operated by a customer or network operator and be connected to the computer network 160.

In some embodiments, components of the system (e.g., the apparatus 100, the database 170 and the network resources 150) can be deployed at any location within the computer network 160 and interconnected with each other via the computer network 160. For example, the database 170 may be located on a remote device, in which case the apparatus 100 can access and retrieve data from the database 170 via the computer network 160 (as shown in FIG. 1). Alternatively, although not shown in FIG. 1, the database 170 may be local to the apparatus and stored on nonvolatile storage (e.g., storage 120) thereof. In some other instances, the database 170 may be distributed so that portions are local and portions are remote with respect to the apparatus 100.

Although not shown in FIG. 1, the computer network 160 (for which the system is configured to monitor network health, diagnose network anomalies and allocate network resources 150) can include various interconnected devices to support wired, wireless, or any other type of two-way communications. In some embodiments, the computer network 160 can be any type of network configured to operatively couple one or more devices (e.g., servers devices, user devices, networking devices, etc.), and enable communications between those devices. In some embodiments, the computer network 160 can include one or more networks such as, for example, a cellular network, a satellite network, a LAN, a WAN, a WLAN, or any wide-area network or combination of networks capable of supporting point-to-point data transfer and communication. In some embodiments, the computer network 160 can include the Internet.

In some embodiments, the computer network 160 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), bluetooth, Wi-Fi, voice over internet protocol (VoIP), Wi-MAX, etc.

As shown in FIG. 1, the apparatus 100 includes a processor 110, a database 120 (e.g., stored in a storage of the apparatus 100), a network interface 130, and a memory 140 including a receiving module 141, a linking module 143, a monitoring module 145, an analysis module 147 and an allocation module 149. In some embodiments, the apparatus 100 can be a server device such as, for example, a background server, a back end server, a database server, a workstation, a desktop computer, a cloud computing server, a data processing server, and/or the like. In some embodiments, the apparatus 100 can be a server cluster or server center consisting of two or more servers (e.g., a data processing server and a database server).

The memory 140 is configured to store software programs and/or instructions for the modules of the apparatus 100 (e.g., the receiving module 141, the linking module 143, the monitoring module 145, the analysis module 147 and the allocation module 149). In some embodiments, the memory 140 can include, for example, one or more random-access memory (RAM) (e.g., a DRAM, a SRAM, a DDR RAM, etc.), read only memory (ROM), non-volatile memory such as one or more magnetic disk storage devices, optical disk storage devices, flash memory devices, or other non-volatile solid state storage devices. In some embodiments, the memory 140 can include one or more storage devices (e.g., a removable memory) remotely located from other components of the apparatus 100.

In some embodiments, a basic input/output system (BIOS), containing the basic routines that help to transfer information between elements, such as during start-up, is typically stored in ROM. RAM typically contains data and/or program modules (e.g., the receiving module 141, the linking module 143, the monitoring module 145, the analysis module 147 and the allocation module 149) that are immediately accessible to and/or presently being operated on by the processing unit (e.g., the processor 110) of the apparatus 100. The data or program modules may include an operating system, application programs, other program modules, and program data. The operating system may be or include a variety of operating systems such as Microsoft WINDOWS operating system, the UNIX operating system, the LINUX operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

In some embodiments, the memory 140 may also include other removable or nonremovable, volatile or nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable or nonremovable, volatile or nonvolatile computer storage media that can be used in the exemplary operating environment include, but are not limited to, magnetic tape cassettes, flash memory cards, digital versatile disks, digital video tape, solid state RAM, solid state ROM, and the like. The memory 140 can be connected to a system bus (not shown in FIG. 1) through a removable or non-removable memory interface. In some embodiments, the database 120 can be stored at a storage device (not shown in FIG. 1) separate from the memory 140. In other embodiments, although not shown in FIG. 1, the database 120 can be stored within the memory 140.

The processor 110 can be any type of processing device or processing unit. The processor 110 can execute various applications, programs and/or functions included in the software programs and/or modules stored in the memory 140. In some embodiments, the processor 110 can be any processing device capable of performing a method for diagnosing network anomalies and allocating network resources 150 for the computer network 160, as shown and described below with respect to FIG. 2. Such a processor can be, for example, a central processing unit (CPU), a digital signal processor (DSP), a field programmable gate array (FPGA), an application-specific integrated circuit (ASIC), and/or the like. The processor 110 can be configured to control the operations of other components and/or modules of the apparatus 100. For example, the processor 110 can be configured to control operations of the network interface 130. For another example, the processor 110 can be configured to execute instructions or code stored in a software program or module (e.g., the receiving module 141, the linking module 143, the monitoring module 145, the analysis module 147 or the allocation module 149) within the memory 140.

The network interface 130 is configured to provide and control network interfaces of the apparatus 100 that are used to interact with other network devices (e.g., network endpoints operated by the customers 190 and the network operator 180). The network interface 130 can include, for example, a standard wired interface and/or a standard wireless interface (e.g., a Wi-Fi interface). In some embodiments, the network interface 130 is used for connecting one or more network devices (e.g., network endpoints) and performing data communication with the one or more network devices. In such embodiments, as described below, the network interface 130 is configured to receive from the network devices, for example, NARs. The network interface 130 is also configured to transmit to other network devices (e.g., network nodes deployed in the computer network 160, which are not shown in FIG. 1), for example, control instructions, commands, policy updates, etc., for allocating network resources 150. In some embodiments, operations of the network interface 130 are controlled by instructions or code stored in the memory 140 (e.g., within a network communications module that is not shown in FIG. 1).

In some embodiments, the apparatus 100 can include more or fewer modules than those shown in FIG. 1. Each module included in the apparatus 100 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in the memory 140 of the apparatus 100 and executed at the processor 110 (e.g., a CPU) of the apparatus 100. Moreover, in some embodiments, the allocation module 149 can be a dedicated hardware component that is separate from the other modules included in the memory 140. Overall, the receiving module 141, the linking module 143, the monitoring module 145, the analysis module 147 and the allocation module 149 can be configured to collectively perform the method for diagnosing network anomalies and allocating network resources 150 for the computer network 160, as shown and described below with respect to FIG. 2.

Figure 2:
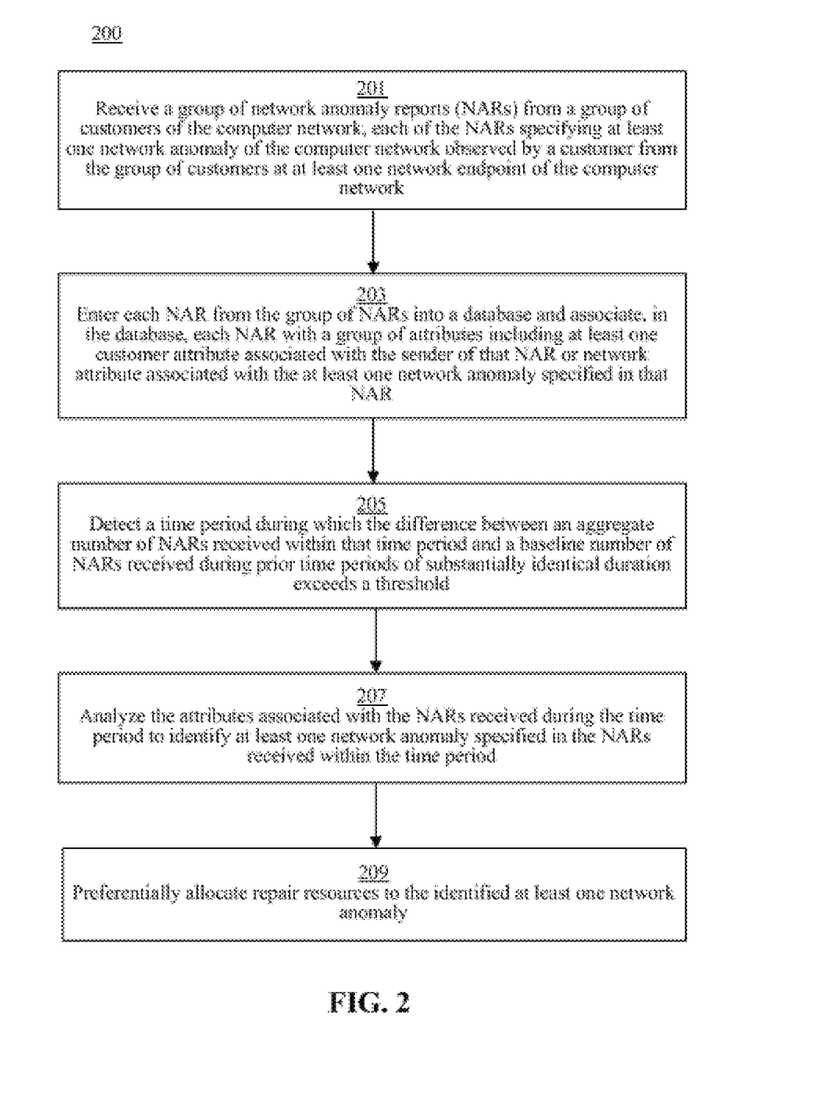
FIG. 2 is a flow chart illustrating a method performed at the system of FIG. 1 for diagnosing network anomalies and allocating repair resources for the computer network of FIG. 1.

FIG. 2 is a flow chart illustrating a method 200 performed at the system of FIG. 1 for diagnosing network anomalies and allocating repair resources (e.g., the network resources 150) for the computer network 160 of FIG. 1. Specifically, the method 200 can be performed collectively by the receiving module 141, the linking module 143, the monitoring module 145, the analysis module 147 and the allocation module 149 of the apparatus 100 in FIG. 1.

In some embodiments, as shown and described above with respect to FIG. 1, the apparatus 100 performing the method 200 includes one or more processors and memory. In such embodiments, the method 200 is governed by instructions or code of one or more applications that are stored in a non-transitory computer readable storage medium (e.g., the memory 140) of the apparatus 100 and executed by the one or more processors (e.g., the processor 110) of the apparatus 100. The application(s) is associated with diagnosing network anomalies and allocating repair resources (e.g., the network resources 150) for the computer network 160. As shown in FIG. 2, the method 200 includes the following steps.

At 201, the receiving module 141 receives NARs (e.g., NARs 195 in FIG. 1) from the customers 190 of the computer network 160. Each of the received NARs specifies at least one network anomaly of the computer network 160 that is observed by a customer 190 at at least one network endpoint of the computer network 160. In some embodiments, the receiving module 141 is configured to record, for each received NAR, a timestamp indicating a time at which that NAR is received.

Specifically, the receiving module 141 can monitor NARs including, for example, customer requests for support and/or customer reports of network problems, which are referred to as "customer calls." Such customer calls are not limited to only telephone calls, but can broadly refer to any type of customer communication, such as email, chat, SMS (short message service) messaging, Web-based interfaces, or any other similar mechanism. Typically, technical-support calls can be an accurate proxy for customer satisfaction: a customer having a satisfactory experience is unlikely to call support, while a customer facing a degraded experience over a period of time is very likely to call to complain about the poor quality of his or her experience. Thus, if multiple customers call to report a common issue within a certain period of time, for example, a network administrator may conclude that there is a true technical problem in the network. Therefore, the customers themselves become the "probes" measuring the health of the network and, in various embodiments, the customer calls include no or very few false positives by their very nature (i.e., customers are unlikely to log a call unless they are experiencing a real issue).

As shown in FIG. 1, the receiving module 141 can send information (e.g., metadata) and/or content of the received NARs to the linking module 143 for processing. Subsequently, at 203 in the method 200, the linking module 143 enters each received NAR into the database 120 and associates, in the database 120, each received NAR with a group of attributes including at least one customer attribute associated with the sender (e.g., a customer 190) of that NAR or network attribute associated with the at least one network anomaly specified in that NAR. In other words, the linking module 143 can link information, such as customer attributes and network attributes, with the received NARs (e.g., incoming customer calls) at the database 120.

In some embodiments, a network attribute of a computer network specifies a characteristic of one or more devices in the computer network. Such a network attribute can be such as, for example, a hardware type, software version, network address, network topology, network outage, network maintenance, network type, etc., associated with the computer network. A network attribute of a computer network can be independent from any particular customer of the computer network (e.g., common to multiple customers), or specifically associated with one or a group of given customers of the computer network. In some embodiments, examples of network attributes include physical network-nodes characteristics (e.g., hardware and software type or version), network addresses, network type, or any other type of physical information.

In some embodiments, a customer attribute of a customer of a computer network specifies a characteristic of the customer or a device (e.g., network endpoint) operated by the customer. Such a customer attribute can be, for example, a service type, location, identifier, type of premises equipment, technician dispatch, hardware type, software version, network address, network type, prior NARs, etc., associated with the customer and/or the device operated by the customer. In some embodiments, examples of customer attributes include service types delivered to the customer, customer location, and the type of customer premises equipment ("CPE").

In some embodiments, depending on the data sources, the linked information may be readily available. For example, the linking module 143 may obtain the linked information (e.g., customer attributes, network attributes) by referring to a customer database (e.g., the database 170 in FIG. 1) or by sending a query to a network node. In other embodiments, other types of linked information may require more involved processing. For instance, in the case of a cable operator, linking a customer to the cable-modem termination system may be straightforward based on the network topology data available. Associating support calls from a group of customers to outage events already detected by an operator, on the other hand, may be more difficult.

As shown in FIG. 1, the database 170 can be a customer database configured to store customer attributes of the customers 190, a network database configured to store network attributes associated with the devices in the computer network 160, or a database configured to store both customer attributes and network attributes. The liking module 143 can access and retrieve, from the database 170 (e.g., via the computer network 160), the attributes (e.g., attributes 175 as customer attributes, network attributes, or both) stored at the database 170. In some embodiments, although not shown in FIG. 1, the database 170 can be local to or hosted within the apparatus 100. In such embodiments, the linking module 143 can directly access and retrieve attributes from the database 170 without going through other networking devices of the computer network 160.

Figure 3:
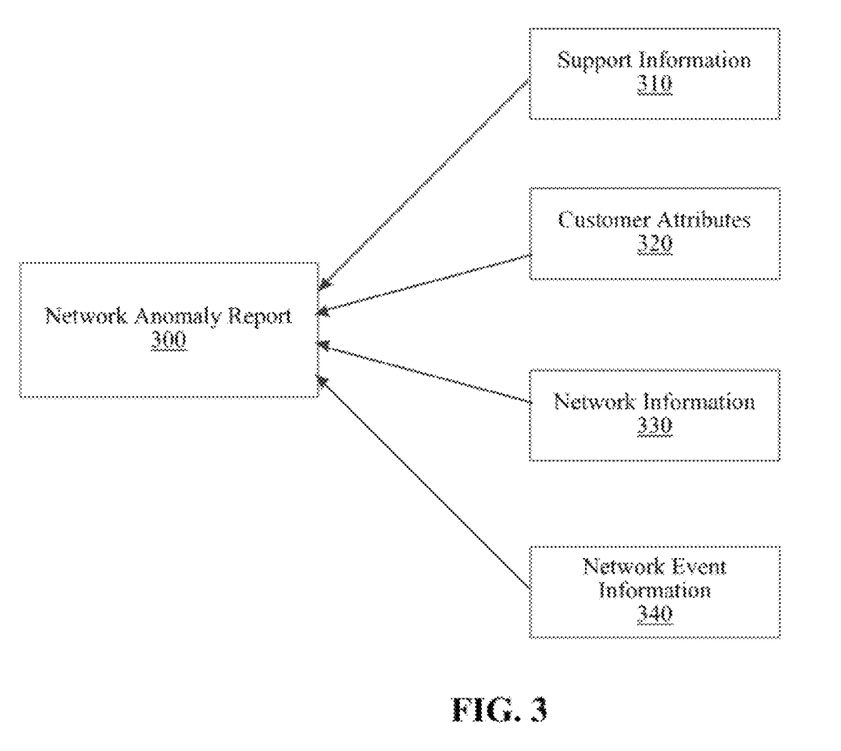
FIG. 3 is a block diagram illustrating potential elements of a network anomaly report (NAR) in accordance with some embodiments.

FIG. 3 is a block diagram illustrating potential elements of a network anomaly report (NAR) 300 in accordance with some embodiments. In some embodiments, FIG. 3 represents a selection of information that may be linked to a customer call. As shown in FIG. 3, the NAR 300 (e.g., customer call) may include, for example, support information 310 (e.g., a trouble ticket, a technician dispatch, etc.), customer attributes 320 (e.g., a service type, a CPE, etc.), network information 330 (e.g., a topology, a software version, etc.), network event information 340 (e.g., an unplanned outage, a scheduled maintenance, etc.), or a combination of any of them.

In some embodiments, some linked information (e.g., customer attributes, network attributes) may change more frequently than other types. Support information and network events, for example, are dynamic data sources and may change frequently. Customer attributes and network information, on the other hand, are semi-static (i.e., they rarely change). When and if linked information changes, the linking module 143 may correspondingly update, in the database 120, associations between the received NARs and the linked information that has changed.

In some embodiments, support information may be linked to a customer call based on a common keyword or number associated with customer calls from the same customer, such as a customer account number that is unique to the customer. In some embodiments, approximate string matching (i.e., a "fuzzy join") may be used to limit the potential matches to a predetermined time window.

In contrast, network events may be more challenging to link to a customer call because a network event does not typically include any information that would associate it with a particular customer. In one embodiment, a series of steps can be used to link network events to customers. In a first step, a list of potentially affected customers is created for each network event. That is, based on a list of available attributes for a customer, the customers who could potentially be impacted by the network event are identified. For example, if the network event is a node outage, all the customers linked directly or indirectly (through a hierarchy of network elements) to the node are identified as being potentially affected by the network event. In a second step, for a given call made by a given customer, the network events that could potentially have affected the customer are ranked based on the starting time and the duration of each network event. In a third step, the network event having the most recent starting time preceding the customer call, within a predetermined time window, is selected.

As shown in FIG. 1, after the linking module 143 links the attributes to each received NAR (e.g., customer call), the linking module 143 can provide information (e.g., attributes, metadata such as the timestamp) of each received NAR to the monitoring module 145. Alternatively, although not shown in FIG. 1, the monitoring module 145 can access and retrieve information and/or data stored in the database 120. Furthermore, the monitoring module 145 can (constantly or periodically) monitor change of the information and/or data associated with the received NARs that is stored in the database 120.

As a result, at 205 of the method 200, the monitoring module 145 detects a time period during which the difference between an aggregate number of NARs received within that time period and a baseline number of NARs received during prior time periods of substantially identical duration exceeds a threshold. Similarly stated, the monitoring module 145 can monitor a current call volume for deviations from a baseline. Specifically, once the NARs (e.g., customer calls) have been enriched with the additional customer attributes and/or network attributes by the linking module 143, the monitoring module 145 can monitor the volumes of the received NARs (e.g., call volumes) across a range of dimensions, and flag potential anomalies when the any of the volumes is higher than an expected baseline.

In some embodiments, the baseline number of NARs associated with the time period can be pre-defined based on historical data associated with the computer network. For example, a baseline of the median number of NARs (e.g., customer calls) in a given hourly bin may be constructed based on historical data, and alerts may be triggered when the volume of current NARs (e.g., current call volume) exceeds the threshold by a certain amount.

Figure 4:
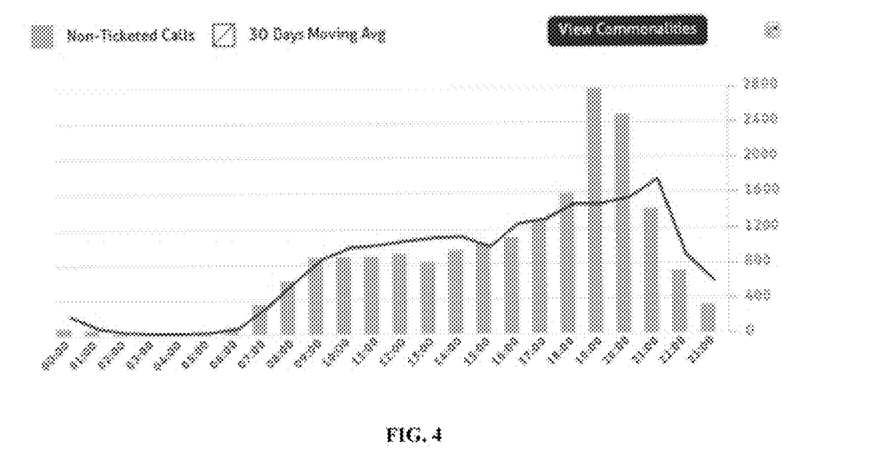
FIG. 4 is a bar diagram illustrating statistics of network anomaly reports (NARs) associated with a computer network in accordance with some embodiments.

FIG. 4 is a bar diagram illustrating statistics of NARs associated with a computer network in accordance with some embodiments. Particularly, as an example, FIG. 4 shows the number of customer calls received by a call center (e.g., a receiving module in a server device similar to the receiving module 141 of the apparatus 100 shown and described above with respect to FIG. 1) from customers from a given region of a computer network over the course of a day, where a 30-day moving average is used as the baseline for the call volume within each hourly bin. As shown in FIG. 4, spikes above the baseline over the 7 PM and 8 PM hourly bins are indicative of bad customer experience during these time windows. Note that the present invention is not limited to any particular baseline or method of computing a baseline. In some other embodiments, any other suitable parameter can also be used as the baseline for anomaly detection. For example, the absolute number of calls or the rate of change of calls within a time period can be monitored in lieu of an average.

Returning to FIG. 2, at 207, the analysis module 147 analyzes the attributes associated with the NARs received during the time period to identify at least one network anomaly specified in the NARs received within the time period. Similarly stated, the analysis module 147 is configured to search for sources of problems when a deviation in the number of NARs (e.g., call volume) within a time period is determined by the monitoring module 145. In some embodiments, in order to identify the network anomaly, the analysis module 147 can determine at least one common attribute among at least a portion of the NARs received within the time period. In some embodiments, in order to identify the network anomaly, the analysis module 147 can compare the attributes associated with the NARs received within the time period with attributes associated with previously received NARs.

In some embodiments, the analysis module 147 can report the identified at least one network anomaly (e.g., the network anomalies 185 in FIG. 1) to the network operator 180 of the computer network 160 (e.g., via the computer network 160 or directly to the network operator 180). In such embodiments, the analysis module 147 can send information of the identified customers to the network operator 180 via, for example, an email, Short Message Service (SMS) text message, automatic phone call, or social media.

Additionally, in some embodiments, the analysis module 147 can be configured to identify, based at least in part on the identified at least one network anomaly and the attributes associated with the NARs received during the time period, a set of customers affected by the at least one network anomaly. The analysis module 147 can then report the identified customers to the network operator 180 in a similar method as described above.

In some embodiments, as shown in FIG. 4, after a monitoring module of an apparatus (e.g., the monitoring module 145 of the apparatus 100) detects a spike in call volume (e.g., 7 PM or 8 PM), the monitoring module can trigger an alert, and then send the information of the detected spike (e.g., the detected time period) to an analysis module of the apparatus (e.g., the monitoring module 145 sends information of the detected time period to the analysis module 147 in FIG. 1). As a result, the analysis module performs a root-cause analysis of the attributes linked to the calls received within the detected time period for the spike. The result of the analysis may be used by the analysis module to pinpoint the main drivers of the problem (i.e., the reason for the spike in call volume).

In various embodiments, the analysis performed by the analysis module does not rely on a "trouble ticket," though ticket and site-visit (i.e., "truck roll") information may be used, if available, to enhance the speed or accuracy of problem detection. In one embodiment, inference of a problem can be carried out without any ticket information, and problems can be detected from unticketed calls alone, before the volume of trouble tickets starts increasing.

In some embodiments, after a monitoring module (e.g., the monitoring module 145 in FIG. 1) detects a time window having a call volume greater than the threshold, an analysis module (e.g., the analysis module 147 in FIG. 1) can perform a root-cause analysis of the different calls' attributes to isolate the most likely reasons why customers submitted those calls during the time window. One way to find the common factor(s) among calls during a given time period includes comparing the characteristics of calls during the spike period with the baseline characteristics of the calls received previously over a similar time window to identify the attributes that differ most between the two populations of calls.

Figure 5:
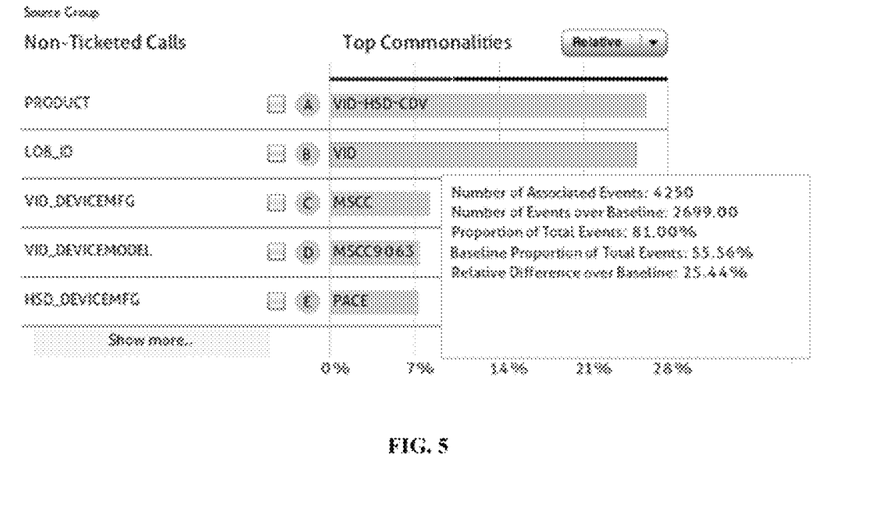
FIG. 5 is a figure presenting results from an analysis of network anomaly reports (NARs) for a computer network in accordance with some embodiments.

As an example, FIG. 5 is a figure presenting results from an analysis of network anomaly reports (NARs) for a computer network in accordance with some embodiments. Specifically, FIG. 5 shows results of such an analysis on the two-hour time window associated with a spike in call volume. As shown in FIG. 5, the left column shows a number of dimensions associated with a NAR (e.g., customer call), such as the range of customer-subscribed products (or services) and information submitted in the call (e.g., the line of business selected by the customer). The X-axis shows the difference in percentage points between the proportion of calls sharing a given feature for both the baseline calls and the calls in the current time window of interest. In this example, video-related ("VID") calls represent 55% of all the calls received in the baseline, while the VID calls represent 81% of call volume in the current time window. The percentage point difference, 26%, is associated to this dimension, as shown in the highlighted row (the second content row) on the right column.

In some embodiments, the root-cause analysis may be performed in parallel across some or all of the different values of some or all of the dimensions associated with a customer call. The (dimension, value) tuples may then sorted based on their corresponding percentage point differences. The combinations with the largest difference may be selected as the prime candidates for further investigation for the cause of the current spike in call volume, in other words, potential network anomaly.

In response to identifying the at least one network anomaly and optionally reporting the identified network anomaly to the network operator 180, the analysis module 147 can also send information of the identified at least one network anomaly to the allocation module 149. Finally at 209 of the method 200 in FIG. 2, the allocation module 149 preferentially allocates repair resources (e.g., the network resources 150) to the identified at least one network anomaly.

As shown in FIG. 1, for example, the allocation module 149 can generate, based on the identified at least one network anomaly, one or more allocation commands 155 that are designed to allocate a part or all of the network resources 150 for fixing the identified network anomaly. In some embodiments, the allocation commands 155 can be associated with allocating network resources among the multiple network anomalies. The allocation module 149 can then send the allocation commands 155 to network node(s) (not shown in FIG. 1) of the computer network 160, such that the allocation commands 155 can be executed at the network node(s). The network node(s) can be any device(s) deployed in the computer network 160 that can control access to and use of the network resources 150. In some embodiments, such a network node can be, for example, a server, a workstation, a terminal, a router, a hub, a switch, a networking server, a gateway, a bridge, a firewall, an interface controller, a wireless access point (WAP), or any other type of device. In some embodiments, a network node can also be referred to as, for example, a network element, a network device, etc. As a result, the network node(s) can allocate network resources 150 among devices of the computer network 160 in accordance with the allocation commands 155, for fixing the identified at least one network anomaly.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method for diagnosing network anomalies and allocating repair resources for a computer network having degraded performance, the method comprising the steps of:
   receiving a plurality of network anomaly reports (NARs) from a plurality of customers of the computer network, each of the NARs specifying at least one network anomaly of the computer network observed by a customer from the plurality of customers at one or more network endpoints of the computer network;
   entering each NAR from the plurality of NARs into a database and associating, in the database, each NAR with a group of attributes including at least one customer attribute associated with the sender of that NAR or network attribute associated with the at least one network anomaly specified in that NAR;
   detecting a non-predetermined time period during which the difference between an aggregate number of NARs received within that time period and a baseline number of NARs received during prior time periods having durations within ±10% of a duration of the detected time period exceeds a threshold;
   analyzing the attributes associated with the NARs received during the time period to identify at least one network anomaly specified in the NARs received within the time period; and
   addressing the degraded performance of the computer network by causing repair of the identified at least one network anomaly via allocation of repair resources to the identified at least one network anomaly.

2. The method of claim 1, wherein a network attribute specifies at least one of a hardware type, software version, network address, network topology, network outage, network maintenance, or network type associated with the computer network.

3. The method of claim 1, wherein a customer attribute specifies at least one of a service type, location, identifier, type of premises equipment, technician dispatch, hardware type, software version, network address, network type or prior NARs associated with a customer of the computer network.

4. The method of claim 1, further comprising identifying, based at least in part on the identified at least one network anomaly and the attributes associated with the NARs received during the time period, a set of customers affected by the at least one network anomaly.

5. The method of claim 1, further comprising reporting the identified at least one network anomaly to a network operator of the computer network via at least one of an email, Short Message Service (SMS) text message, automatic phone call, or social media.

6. The method of claim 1, further comprising recording, for each NAR from the plurality of NARs, a timestamp indicating a time at which that NAR is received.

7. The method of claim 1, wherein the baseline number of NARs associated with the time period is pre-defined based on historical data associated with the computer network.

8. The method of claim 1, wherein identifying the at least one network anomaly includes determining at least one common attribute among at least a portion of the NARs received within the time period.

9. The method of claim 1, wherein identifying the at least one network anomaly includes comparing the attributes associated with the NARs received within the time period with attributes associated with NARs received prior to the time period.

10. The method of claim 1, wherein the time period is detected based on a baseline number of NARs received during prior time periods having durations within ±5% of the duration of the detected time period.

11. The method of claim 1, wherein the repair resources allocated to the identified at least one network anomaly comprise computational repair resources.

12. A system for diagnosing network anomalies and allocating repair resources for a computer network having degraded performance, the system comprising:
nonvolatile computer storage including a database for storing information associated with network anomaly reports (NARs) received from a plurality of customers of the computer network, each of the NARs specifying at least one network anomaly of the computer network observed by a customer from the plurality of customers at one or more network endpoints of the computer network;
one or more computer processors configured for executing computer instructions;
a linking module that is executable by the one or more computer processors, the linking module being configured to enter each received NAR into the database and associate, in the database, each received NAR with a group of attributes including at least one customer attribute associated with the sender of that NAR or network attribute associated with the at least one network anomaly specified in that NAR;
a monitoring module that is executable by the one or more computer processors, the monitoring module being configured to detect a non-predetermined time period during which the difference between an aggregate number of NARs received within that time period and a baseline number of NARs received during prior time periods having durations within ±10% of a duration of the detected time period exceeds a threshold;
an analysis module that is executable by the one or more computer processors, the analysis module being configured to analyze the attributes associated with the NARs received within the time period to identify at least one network anomaly specified in the NARs received within the time period; and
an allocation module that is executable by the one or more computer processors, the allocation module being configured to address the degraded performance of the computer network by causing repair of the identified at least one network anomaly via allocation of repair resources to the identified at least one network anomaly.

13. The system of claim 12, wherein a network attribute specifies at least one of a hardware type, software version, network address, network topology, network outage, network maintenance, or network type associated with the computer network.

14. The system of claim 12, wherein a customer attribute specifies at least one of a service type, location, identifier, type of premises equipment, technician dispatch, hardware type, software version, network address, network type or prior NARs associated with a customer of the computer network.

15. The system of claim 12, wherein the analysis module is configured to determine at least one common attribute among at least a portion of the NARs received within the time period.

16. The system of claim 12, wherein the analysis module is configured compare the attributes associated with the NARs received within the time period with attributes associated with NARs received prior to the time period.

17. An apparatus for diagnosing and repairing network anomalies in a computer network having degraded performance, the apparatus comprising a receiving module, a linking module, a monitoring module, an analysis module, and an allocation module, wherein:
the receiving module is configured to receive a plurality of network anomaly reports (NARs) from a plurality of customers of the computer network, each of the NARs specifying at least one network anomaly of the computer network observed by a customer from the plurality of customers at one or more network endpoints of the computer network;
the linking module is configured to enter each received NAR into a database and associate, in the database, each received NAR with a group of attributes including at least one customer attribute associated with the sender of that NAR or network attribute associated with the at least one network anomaly specified in that NAR;
the monitoring module is configured to detect a non-predetermined time period during which the difference between an aggregate number of NARs received within that time period and a baseline number of NARs received during prior time periods having durations within ±10% of a duration of the detected time period exceeds a threshold;
the analysis module is configured to analyze the attributes associated with the NARs received during the time period to identify at least one network anomaly specified in the NARs received within the time period; and
the allocation module is configured to address the degraded performance of the computer network by causing repair of the identified at least one network anomaly via allocation of repair resources to the identified at least one network anomaly.

18. The system of claim 12, wherein the monitoring module is configured to detect the time period based on a baseline number of NARs received during prior time periods having durations within ±5% of the duration of the detected time period.

19. The system of claim 12, wherein the allocation module is configured to allocate repair resources comprising computational repair resources.

20. The apparatus of claim 17, wherein the analysis module is further configured to identify, based at least in part on the identified at least one network anomaly and the attributes associated with the NARs received during the time period, a set of customers affected by the at least one network anomaly.

21. The apparatus of claim 17, wherein the analysis module is further configured to report the identified at least one network anomaly to a network operator of the computer network via at least one of an email, Short Message Service (SMS) text message, automatic phone call, or social media.

22. The apparatus of claim 17, wherein the receiving module is further configured to record, for each NAR from the plurality of NARs, a timestamp indicating a time at which that NAR is received.

23. The apparatus of claim 17, wherein the baseline number of NARs associated with the time period is predefined based on historical data associated with the computer network.

24. The apparatus of claim 17, wherein the monitoring module is configured to detect the time period based on a baseline number of NARs received during prior time periods having durations within ±5% of the duration of the detected time period.

25. The apparatus of claim 17, wherein the allocation module is configured to allocate repair resources comprising computational repair resources.

* * * * *